United States Patent [19]

Neumann

[11] Patent Number: 4,564,096
[45] Date of Patent: Jan. 14, 1986

[54] DISENGAGEABLE ROTARY CLUTCH

[75] Inventor: Kurt Neumann, Buxtehude, Fed. Rep. of Germany

[73] Assignee: Claudius Peters, Fed. Rep. of Germany

[21] Appl. No.: 492,387

[22] Filed: May 6, 1983

[30] Foreign Application Priority Data

Oct. 6, 1982 [DE] Fed. Rep. of Germany ....... 3236926

[51] Int. Cl.$^4$ .......................... F16D 1/00; F16D 11/00; F16D 23/02; F16L 23/00
[52] U.S. Cl. .............................. 192/67 R; 192/114 R
[58] Field of Search .......................... 192/67 R, 114 R; 403/335–355, 380; 464/35–36

[56] References Cited

U.S. PATENT DOCUMENTS

| | | | |
|---|---|---|---|
| 3,270,844 | 9/1966 | Orwin | 192/56 R |
| 3,653,226 | 4/1972 | Westbury | 464/36 |
| 3,722,644 | 3/1973 | Steinhagen | 464/36 |
| 3,760,916 | 9/1973 | Hanks et al. | 192/67 R |
| 4,317,511 | 3/1982 | Asai | 464/36 |

Primary Examiner—Rodney H. Bonck
Assistant Examiner—Alan G. Towner
Attorney, Agent, or Firm—Eric P. Schellin

[57] ABSTRACT

Disengageable clutch with two clutch flanges which enclose a meshing arrangement which can be released and closed by axially shifting one of the two clutch flanges. The meshing arrangement is formed by pairs of bores which are opposite each other in the flanges and by balls. A nut is used to engage the clutch, which nut can be screwed on the spindle carrying the clutch flanges. A spring between the nut and the movable clutch flange holds the clutch flanges and the meshing arrangements against each other in the disengaged state, but when the shaft is turned manually it allows the balls to jump out of one of the associated bores. The rotary position in which the clutch can be engaged ty tightening the nut is easy to find on account of the click-stop action of the balls.

5 Claims, 1 Drawing Figure

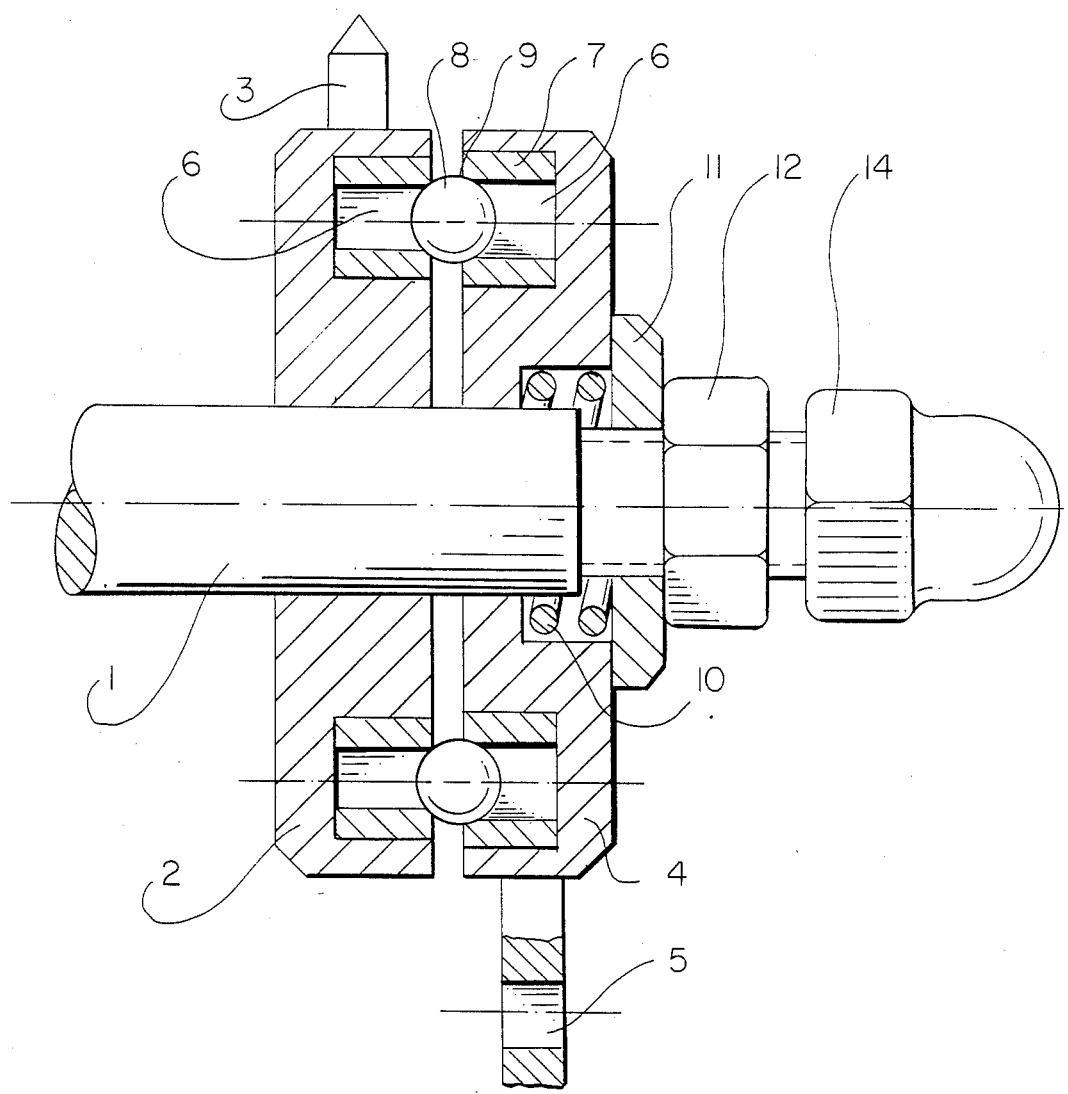

DISENGAGEABLE ROTARY CLUTCH

FIELD OF THE INVENTION

The invention concerns a disengageable rotary clutch with a first clutch flange with a device for connection to a drive device, and with a second clutch flange to be connected to the shaft to be driven, which flanges can rotate coaxially and relative to one another, can shift axially and cooperate in a positive connection over at least one eccentric meshing arrangement when they are pressed together by a locking element.

BACKGROUND OF THE INVENTION

It is required in some rotary clutches that the clutch has no play in its closed state and that the clutch flanges are brought back together in the same angular position after the release and after any relative rotation which may have occurred in the released state. An example of this are the rotary clutches which are positioned between a motor drive and a driven member to be moved and precisely set, e.g., a slide. Too much play between the drive and the driven member would in such an instance adversely affect the adjustment accuracy and cause a constant instability in the regulating circuit. A clutch is necessary between the drive and the driven member in order to make manual operation possible, e.g., if the drive energy stops or if maintenance is performed on the driven member. It can be necessary, considering the regulating tasks in the engaged state, that certain geometric relationships are constantly assured between the drive and the driven member. Known clutches of this type are very expensive on account of the requirements of great precision placed on the specially shaped individual parts; however, the aim striven for is never quite satisfactorily reached.

The invention therefore has the task of creating a rotary clutch of the type initially mentioned which is inexpensive to construct, without play and which assures a predetermined angular position of the clutch parts in relation to each other even after a relative rotation of the clutch parts in the disengaged state after reengagement.

SUMMARY OF THE INVENTION

The solution of the invention consists in the following: The meshing arrangement connecting the clutch flanges is formed by a rolling body and two opposite recesses in the clutch flanges, each of which cooperates with the rolling body over a pair of surfaces inclined in a circumferential direction, and the clutch flanges are also pressed together by a spring when the locking element is released.

It is advantageous if at least one recess of a meshing arrangement is formed by a bore and the rolling member by a ball which cooperates with advantage with the edge of the bore. That is, the bore diameter is less than the diameter of the ball.

According to another characteristic of the invention the angle of inclination of the surfaces cooperating with the rolling body is considerably steeper on one of the two clutch flanges that it is on the other, which is achieved with advantage when using bores cooperating with a ball by unequal bore diameters.

The cooperation of the roller body with a pair of concavely inclined surfaces on each clutch flange results in a geometrically unambiguous, play-free association when the rolling body is pressed into the recesses on both sides under the action of the shifting member compressing the clutch flanges. This assures a play-free working of the clutch. If the locking element is released, the clutch flanges are still pressed together by the spring action. However, they can be rotated counter to one another, whereby the rolling body jumps out of at least one of the two recesses. Before the clutch is closed again, the clutch flanges are returned to the initial position, which is easy to find, as the rolling body jumps back under the spring action into the recesses on both sides like an index positioning at a corresponding rotation of the clutch flanges and holds the clutch flanges fast in this position. If the locking element is tightened when the two clutch flanges are in this position secured by index action, this assures that the clutch reproduces precisely those geometric relationships in the engaged state which existed before the clutch was disengaged.

A particularly preferred embodiment of the invention is characterized in that the second clutch flange is rigidly connected to a shaft upon which the first clutch flange is mounted in such a manner that it can move axially and circumferentially. The shaft is provided with a threading for a nut which functions as a locking element for the first clutch flange. The spring is constructed as a pressure spring and surrounds the shaft between the first clutch flange and the nut. A hand grip can be provided at the end of the shaft for turning the second clutch flange when the clutch is released, e.g. a secured cap nut.

It is readily apparent that close fits are hardly necessary in the manufacture of the clutch of the invention. If, for example, two or three meshing arrangements are provided on the circumference, each of which consists of a ball and a pair of bores, the relative position of the clutch flanges to one another is determined in the engaged state exclusively by the position of the bores to each other. Inexactitudes of the bearing of the clutch disks on the shaft have no effect. Likewise, diametral tolerances of the bores used in the meshing arrangements or diametral tolerances of the balls have no consequences for the meshing exactitude. All that is required is that the bores on both sides lie precisely opposite each other. The bores can be provided with customary, hardened bushings. It is also possible to make wide use of standard parts for the other components instead of expensive custom-made parts. Finally, the invention has the advantage that the coupling can be constructed to be extremely compact and that the rotary hand grip for turning the driven part when the clutch is disengaged does not project radially from the clutch as it does in previously known constructions, but projects axially at the end. This makes it possible to leave the requisite protective housing in place even when the clutch should be released and turned manually. It has been noted that otherwise the operating person can frequently neglect to attach the protective housing.

The rotary position in which the clutch can be engaged by tightening the nut is easy to find on account of the clickstop action of the balls.

BRIEF DESCRIPTION OF THE DRAWINGS

The invention is explained in more detail below in an embodiment shown in the sole FIGURE in a longitudinal section.

DESCRIPTION OF THE PREFERRED EMBODIMENT

The second clutch flange 2 is welded onto shaft 1 of a slide which is also the driven shaft of the clutch. A weld connection can be used, because all other clutch parts which might have to be serviced are located on the side of the free shaft end away from this clutch flange, and therefore flange 2 can be left in place on shaft 1 during maintenance on the clutch. It carries pointed, notched pin 3 on its circumference which indicates the position of the clutch and can function as a stop.

Shaft 1 extends past second clutch flange 2 to the right in the drawing and carries the first clutch flange 4 which can move axially, is rotatable and is rigidly connected to lever 5 which is the place where the motor drives the clutch.

The opposed frontal surfaces of flanges 2 and 4 contain bores 6 at two diametrically opposite positions. These bores are reinforced by pressing in customary hardened bore bushings 7. The bores 6 in the first flange 4 are somewhat larger in diameter than those of the second flange 2, but they are still somewhat smaller than the diameter of steel ball 8 held between each two bore pairs 6. Edges 9 of bores 6 cooperate with the associated ball over oblique surfaces which are formed by the ball surface and whose inclination is determined by the relationship of the ball diameters and of the bore diameters. Since the bore diameters on the side of the first clutch flange are greater than they are in the other one, the balls in them are held fast during a relative circumferential rotation of the flanges counter to one another, while they jump out of the bores of the second clutch flange.

Pressure spring 10 is axially adjacent to the first clutch flange 4 on shaft 1. This spring is loaded over washer 11 by nut 12, which can be screwed onto threading 13 of a prolongation of shaft 1. The free screwing section is limited by cap nut 14 which is screwed onto the end of the shaft end and is provided with an anti-rotation lock.

In the position shown nut 12 is screwed firmly to the left in the drawing, thus pressing balls 8 tight between edges 9 of bores 6 located in clutch flange 2 and 4. This connects the flanges to one another in a positive connection and without play. If nut 12 is screwed to the right up to cap nut 14, the first clutch flange 4 is still pressed by spring 10 against the second clutch flange, so that the shown position of the two flanges and of the balls remains the same at first. However, if a wrench is used on cap nut 14, shaft 1 and therewith the second clutch flange 2 can be manually turned. Balls 8 can now slide out of bores 6 of the second clutch flange 2 under a corresponding shifting of the first clutch flange 4 against the action of spring 10.

If the clutch is to be closed again, shaft 1 is turned manually until balls 8 snap back in place. Then, nut 12 is screwed to the left to assure the coupling state.

It is apparent that the clutch can readily be provided with a protective housing which is axially open and thus allows the clutch to be actuated without having to be removed.

What is claimed is:

1. A mechanically actuatable rotary clutch for rotating a driven shaft in response to a drive means, the clutch comprising:

a first clutch flange having a device for connection to the drive means;

a second clutch flange is fixedly mounted on the driven shaft, the first clutch flange is also mounted on the driven shaft coaxial with the second clutch flange, the second clutch flange is capable of being rotated together with or relative to the first clutch flange;

rolling means are positioned between the two clutch flanges, each clutch flange is provided with opposed recesses into which the rolling means is received the recesses are provided with circumferential inclined surfaces wherein the rolling means cooperates with the circumferentially inclined surfaces of the opposed recesses;

a rigid locking element including a nut and a means for directly abutting the first clutch flange in a locking position for forcing and locking the first clutch flange and the rolling means against the second clutch flange for directly transferring movements initiated by the drive means to the second clutch flange and rotational movement to the driven shaft; and a spring means for pressing the clutch flanges together when the rigid locking element is released from the locking position for forcing and locking the clutch flanges together.

2. A rotary clutch as defined by claim 1 wherein at least one of the opposed recesses is formed by a bore in one of the clutch flanges and the rolling means comprises at least one ball which cooperates with the circumferentially inclined surfaces of the opposed recesses.

3. A rotary clutch as defined by either claim 1 or 2 wherein the angle of inclination of the circumferentially inclined surfaces of the opposed recesses is considerably steeper on one of the clutch flanges than it is on the other clutch flange.

4. A rotary clutch as defined by claim 3 wherein all of the opposed recesses are formed from opposed bores in the clutch flanges, the bores have edges which cooperate with the at least one ball, and all the bores on one of the clutch flanges have diameters larger than all the bores on the other clutch flange.

5. A rotary clutch as defined by claim 4 further comprising a handgrip mounted on one end of the driven shaft so that when the rigid locking element is released from forcing the clutch flanges together, the second clutch flange can be turned relative to the first clutch flange.

* * * * *